July 30, 1968 G. F. ROGERS 3,395,313

TELEVISION DEFLECTION POWER RECOVERY CIRCUIT

Filed Nov. 15, 1965

INVENTOR.

GORDON F. ROGERS

Eugene M. Whitacre

ATTORNEY

3,395,313
TELEVISION DEFLECTION POWER RECOVERY CIRCUIT

Gordon F. Rogers, Indianapolis, Ind., assignor to Radio Corporation of America, a corporation of Delaware Filed Nov. 15, 1965, Ser. No. 507,797
9 Claims. (Cl. 315—27)

The present invention relates to electromagnetic cathode ray beam deflection circuits of the type employed in television receivers wherein a portion of the reactive energy in the horizontal deflection system is fed back to the power supply during the trace portion of each deflection cycle to improve the overall operating efficiency of the system.

In general, such power recovery circuits utilize a rectifier to return energy from the reactive components of the deflection system to the power supply. During the retrace portion of each deflection cycle, the rectifier, which is coupled to a high voltage portion of a horizontal output transformer, may be subjected to a substantial reverse voltage (e.g. of the order of 1200 to 1500 volts). Presently available rectifiers suitable for this application which are capable of withstanding a reverse voltage of such a magnitude are undesirably costly.

It is therefore an object of the present invention to provide a power recovery circuit for use in connection with a television horizontal deflection circuit wherein relatively inexpensive power recovery rectifiers may be utilized.

It is a further object of the present invention to substantially reduced the reverse voltage to which such power recovery rectifiers are subjected.

In accordance with the present invention, a power recovery circuit for use in connection with a television horizontal deflection circuit comprises an output transformer associated with the deflection circuit having a primary and at least two secondary windings. The series combination of a diode rectifier and a capacitor is coupled across one of the secondary windings. The second secondary winding and a second diode rectifier are coupled in series with the capacitor across a direct voltage supply to return energy to the supply upon conduction in the diode rectifiers. A deflection yoke is coupled to at least one of said secondary windings.

Figure 1:
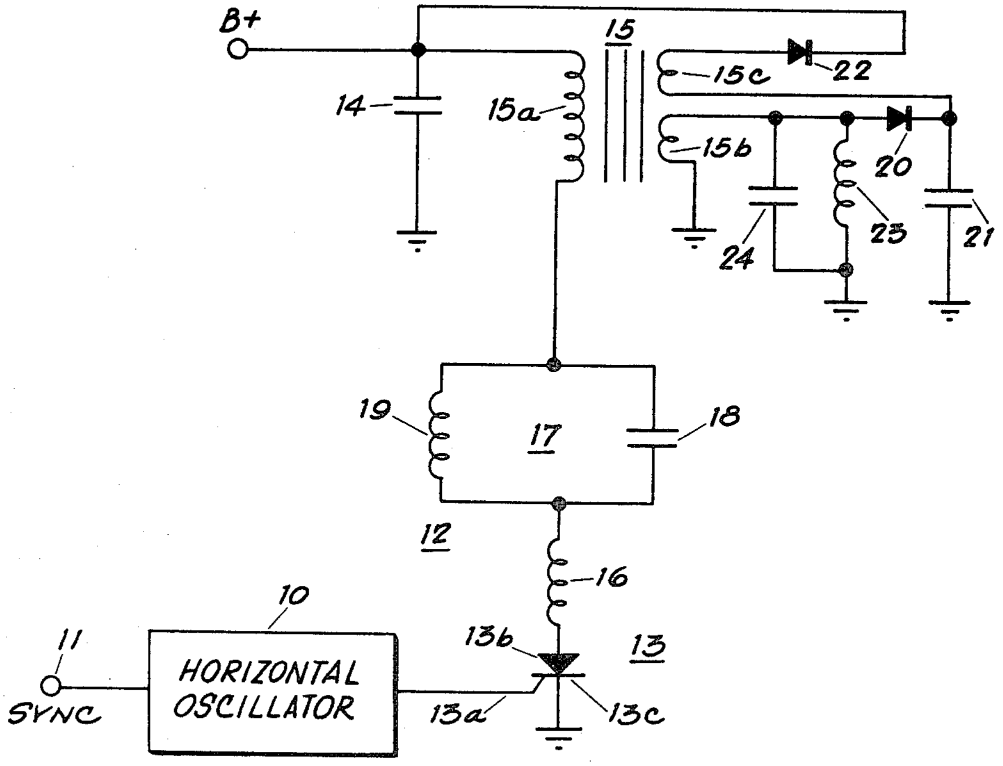
Figure 2:
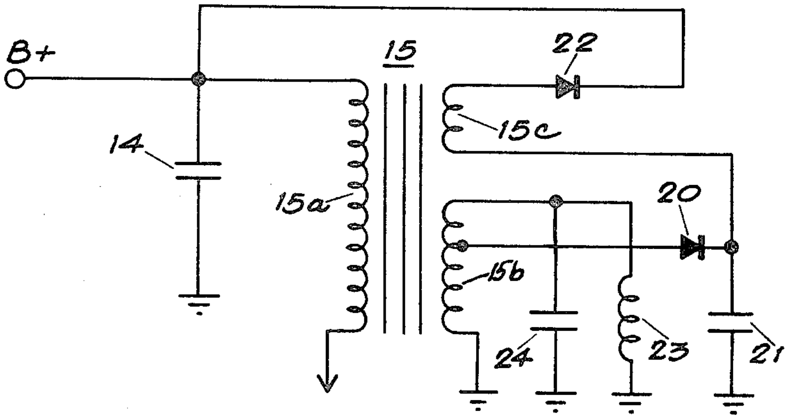

The novel features that are considered characteristic of this invention are set forth with particularity in the appended claims. The invention itself, however, both as to its organization and method of operation, as well as objects and advantages thereof, will best be understood from the following description when read in connection with the accompanying drawings, in which:

FIGURE 1 is a schematic circuit diagram, partially in block diagram form, of a television horizontal deflection circuit including a power recovery circuit constructed in accordance with the present invention; and FIGURE 2 is a schematic circuit diagram of a modification of a portion of the circuit of FIGURE 1.

While the invention may be utilized in connection with many different types of horizontal deflection circuits, it may be used to advantage in connection with a deflection circuit of the type described in a co-pending application of John B. Beck, Ser. No. 494,184, filed Oct. 8, 1965, Entitled "Electron Beam Deflection Circuit" and will be described in connection with use in such a deflection circuit.

Referring to the drawing, the deflection circuit includes a horizontal oscillator 10 to which synchronizing signals may be applied at terminal 11. The output of oscillator 10 is applied to a horizontal deflection waveform generating circuit indicated generally by the reference number 12. Horizontal deflection waveform generating circuit 12 comprises a solid state switching device such as a silicon controlled rectifier (SCR) 13. SCR 13 is provided with a gate electrode 13*a*, to which the output of horizontal oscillator 10 is applied, an anode electrode 13*b* and a cathode electrode 13*c*. Cathode electrode 13*c* is coupled to a reference voltage such as chassis ground. A direct B+ voltage supply (e.g. 140 v.) is coupled from a filter capacitor 14 to anode electrode 13*b* by means of a series combination of energy storage components comprising the primary winding 15*a* of a transformer 15, a first inductor 16 and a parallel resonant circuit 17 including an energy storage capacitor 18 and a second inductor 19.

In accordance with the present invention transformer 15 further comprises a pair of secondary windings 15*b* and 15*c*. One end of winding 15*b* is connected to chassis ground while the other end is connected by means of a first damper diode 20 to a first energy storage capacitor 21, the opposite end of capacitor 21 being connected to ground. One end of winding 15*c* is connected to the junction of diode 20 and capacitor 21 while the other end of winding 15*c* is connected to a second damper diode 22, second damper diode 22 being returned to the B+ filter capacitor 14.

The parallel combination of a horizontal deflection winding 23 and a retrace capacitor 24 is coupled across transformer winding 15*b*.

In the operation of the horizontal deflection circuit 12, energy is supplied from the B+ supply to the energy storage components 16, 18 and 19 by means of SCR 13 during the retrace portion and, where desirable, during the initial part of the trace portion of each deflection cycle. SCR 13 is turned on at the beginning of retrace by means of a pluse applied by horizontal oscillator 10 and is turned off, as is explained in the above-mentioned Beck application, by means of the operation of energy storage components 16, 18, and 19. During retrace, energy is also transferred via transformer 15 to deflection winding 23 and capacitor 24 so that a sawtooth current may be produced in the deflection winding 23. The sawtooth current is characterized by a relatively long duration, substantially linear trace portion and a relatively short during, half-sinusoidal retrace portion. During the retrace portion of each deflection cycle, the current and voltage associated with deflection winding 23 undergo substantially one-half cycle of oscillation the period of which is essentially determined by the resonant frequency of the inductance of deflection winding 23 and the capacitance of the retrace capacitor 24. The voltage across deflection winding 23 during this portion of the cycle rises to a substantial negative value. During the trace portion of each deflection cycle the voltage across deflection winding 23 is maintained substantially constant by means of diode 20 at a positive value lower than the peak negative value reached during retrace, the positive and negative values being related according to the relative durations of trace and retrace so as to provide substantially zero average voltage across deflection winding 23. If diode 20 were returned directly to the B+ supply voltage (i.e. to filter capacitor 14), a turns ratio between windings 15*a* and 15*b* would be required such that a reverse voltage of approximately 1200 volts would be applied across diode 20 during retrace. In accordance with the present invention, the turns ratio of windings 15*a* and 15*b* is reduced substantially so as to produce approximately 600 volts across diode 20 during retrace. A positive voltage of approximately 70 volts therefore will be produced across capacitor 21 as a result of energy recovery during the trace portion of each deflection cycle. The additional winding 15*c*, of substantially the same number of turns as winding 15*b*, in connection with second damper diode 22 and filter capacitor 14 serve to produce an additional positive voltage of 70 volts which, when added to the voltage across capacitor 21, permits connection of diode 22 directly back to the 140 volt B+ voltage supply. The diodes 20 and 22 both conduct during the trace interval with the respective diode circuits each developing about one half of the B+ voltage for power recovery purposes.

The sum of the turns of the two windings **15*b* and 15*c*** is substantially equal to the number of turns which would be required if a single secondary winding and a single damper diode having a 1200 volt reverse voltage rating was used.

While the circuit has been described for substantially equal turns in windings **15*b* and 15*c* so as to permit use of damper diodes having substantially equal reverse voltage ratings, it should be recognized that different turns ratios may also be used if desired. Furthermore, in the circuit shown in the figure the inductance of deflection winding 23 is less than the inductance which would be used where a single damper diode is connected directly back to the B+ voltage supply because the voltage supplied by the winding 15*b* is less. At the same time the capacitance of retrace capacitor 24 is increased to provide the desired retrace time. In an alternative circuit additional turns may be provided on winding 15*b* so that a higher inductance deflection winding may be coupled across the entire winding 15*b* while the damper diode 20 is connected to a point on winding 15*b*** other than the last turn, as is shown in FIGURE 2.

Where the windings **15*b* and 15*c*** are to have equal numbers of turns, it is advantageous to wind such elements in a bifilar manner.

While the invention has been described in connection with a particular type of deflection circuit, it will be recognized that it equally may be applied to trace or retrace driven circuits as well as to circuits utilizing electron tubes or solid state devices.

What is claimed is:

1. In a television receiver, a circuit for use in connection with a horizontal deflection circuit comprising,

- a direct voltage supply having a pair of supply terminals for providing energy to the horizontal deflection circuit,
- a horizontal output transformer associated with said deflection circuit having a primary winding and first and second secondary windings,
- a first damper diode coupled in series relation with a first energy storage capacitor to said first secondary winding,
- a second damper diode, means coupling said energy storage capacitor, said second damper diode and said second secondary winding in series relation between said supply terminals, and
- a horizontal deflection winding coupled to said horizontal output transformer.

2. A circuit according to claim 1 wherein said first and second secondary windings have substantially the same number of turns.

3. A circuit according to claim 1 wherein

- said direct voltage supply includes a supply terminal and a reference terminal for providing energy to the horizontal deflection circuit,
- said one secondary winding, first damper diode, other secondary winding and second damper diode being coupled in the order named in series relation between said reference and supply terminals.

4. A circuit according to claim 3 wherein the terminal of said first capacitor remote from said first damper diode is coupled to the reference terminal of said direct voltage supply.

5. A circuit according to claim 4 wherein said direct voltage supply includes a second energy storage capacitor coupled between said supply and reference terminals.

6. A circuit in accordance with claim 5 for use in connection with a horizontal deflection circuit wherein said direct voltage supply is coupled by means of said primary winding of said horizontal output transformer to the horizontal deflection circuit.

7. In a television receiver, a circuit in accordance with claim 6 for use in connection with a horizontal deflection circuit wherein said first and second damper diodes are poled for transfer of energy to said first and second capacitors respectively during the trace portion of each horizontal deflection cycle.

8. A circuit in accordance with claim 7 wherein said first and second secondary windings are proportioned such that a direct voltage produced across said first capacitor is substantially one-half the voltage provided by said direct voltage supply.

9. A circuit according to claim 1 wherein said horizontal deflection winding is coupled to at least one of said secondary windings.

References Cited

UNITED STATES PATENTS 3,195,009 7/1965 Poorter ............ 315—27

RODNEY D. BENNETT, *Primary Examiner.*

T. H. TUBBESING, *Assistant Examiner.*